(12) United States Patent
Huff et al.

(10) Patent No.: US 8,053,396 B2
(45) Date of Patent: Nov. 8, 2011

(54) SURFACTANT MIXTURES FOR TERTIARY OIL RECOVERY

(75) Inventors: Jürgen Huff, Ludwigshafen (DE);
Günter Oetter, Frankenthal (DE);
Angelika Kühnle, Osnabrück (DE);
Susanne Petrovic, Ludwigshafen (DE);
Marcus Guzmann, Mühlhausen (DE);
Ingo Münster, Böhl-Iggelheim (DE);
Gregor Brodt, Heppenheim (DE)

(73) Assignee: BASF SE (DE)

( * ) Notice: Subject to any disclaimer, the term of this patent is extended or adjusted under 35 U.S.C. 154(b) by 205 days.

(21) Appl. No.: 11/916,916

(22) PCT Filed: Jun. 8, 2006

(86) PCT No.: PCT/EP2006/062993
§ 371 (c)(1),
(2), (4) Date: Dec. 7, 2007

(87) PCT Pub. No.: WO2006/131541
PCT Pub. Date: Dec. 14, 2006

(65) Prior Publication Data
US 2008/0194435 A1    Aug. 14, 2008

(30) Foreign Application Priority Data
Jun. 9, 2005    (DE) .......................... 10 2005 026 716

(51) Int. Cl.
*C09K 8/584*    (2006.01)
*C09K 8/524*    (2006.01)
*E21B 43/16*    (2006.01)

(52) U.S. Cl. ......... 507/246; 507/239; 507/936; 166/275

(58) Field of Classification Search .................. 507/219, 507/239, 246, 935; 166/275
See application file for complete search history.

(56) References Cited

U.S. PATENT DOCUMENTS
4,074,759 A * 2/1978 Bousaid ..................... 166/270.1
(Continued)

FOREIGN PATENT DOCUMENTS
EP    0 444 760 A1    9/1991

OTHER PUBLICATIONS
Taylor et al., "Water-soluble hydrophobically associating polymers for improved oil recovery: A literature review", *Journal of Petroleum Science and Engineering*, vol. 19, pp. 265-280 (1998).

*Primary Examiner* — Timothy J. Kugel
*Assistant Examiner* — Aiqun Li
(74) *Attorney, Agent, or Firm* — Connolly Bove Lodge & Hutz, LLP

(57) ABSTRACT

Use of a mixture comprising a surfactant and a cosurfactant in the form of an aqueous solution for flooding underground deposits of hydrocarbons for mobilizing and recovering the hydrocarbons from the underground deposits, the cosurfactant being a substance or a group of substances selected from the following list:

Figure 1:
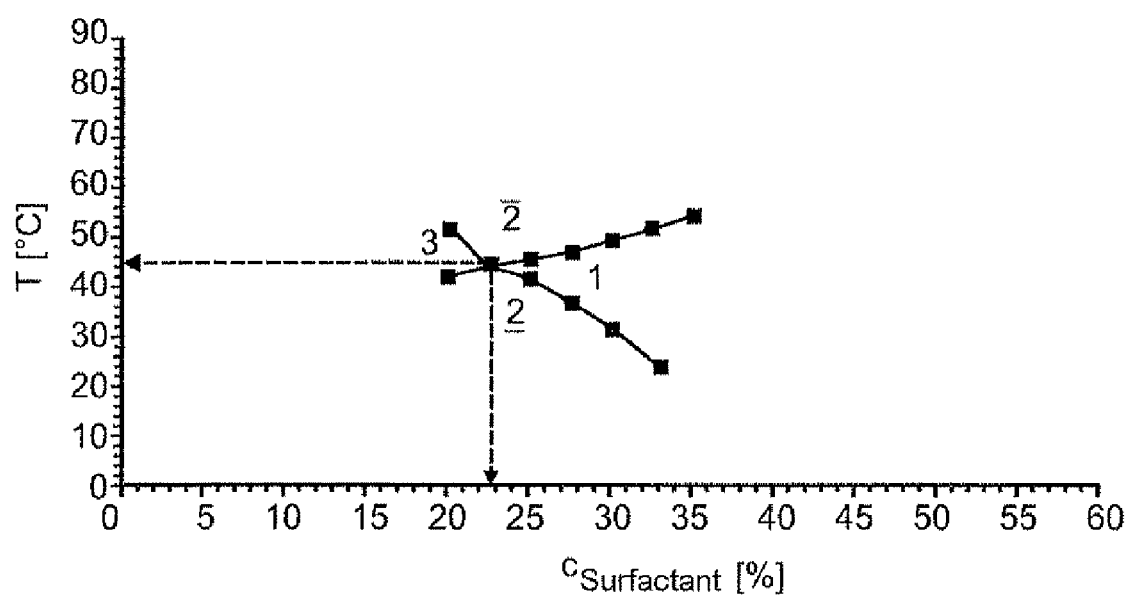

an amphiphilic comb polymer having a backbone with two or more side chains attached to the backbone, the side chains differing from one another and/or the side chains differing from the backbone in their amphiphilic character, an amphiphilic polymer having one or more hydrophobic subunits [$A_2$] based on a polyisobutene block, at least 50 mol % of whose polyisobutene macromolecules have terminally arranged double bonds, and one or more hydrophilic subunits [$B_2$], or an amphiphilic polymer having the general structural formula

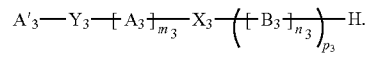

8 Claims, 2 Drawing Sheets

U.S. PATENT DOCUMENTS

| | | |
|---|---|---|
| 4,265,264 A | 5/1981 | Sifferman |
| 4,266,610 A | 5/1981 | Meister |
| 4,341,265 A * | 7/1982 | Blair, Jr. .................. 166/400 |
| 4,534,411 A | 8/1985 | Morita et al. |
| 4,844,756 A | 7/1989 | Forsberg |
| 5,110,487 A | 5/1992 | Current |
| 5,229,017 A | 7/1993 | Nimerick et al. |
| 5,747,619 A | 5/1998 | Denzinger et al. |
| 6,677,293 B1 * | 1/2004 | Allgaier et al. .............. 510/417 |
| 6,706,667 B1 | 3/2004 | Smith et al. |
| 6,828,281 B1 | 12/2004 | Hou et al. |
| 2004/0171759 A1 * | 9/2004 | Lange et al. .................. 525/192 |
| 2005/0085397 A1 | 4/2005 | Hou et al. |
| 2005/0090611 A1 * | 4/2005 | Huffer et al. .................. 524/800 |

\* cited by examiner

SURFACTANT MIXTURES FOR TERTIARY OIL RECOVERY

RELATED APPLICATIONS

This application is a national stage application (under 35 U.S.C. §371) of PCT/EP2006/062993, filed Jun. 8, 2006, which claims benefit of German application 10 2005 026 716.5, filed Jun. 9, 2005.

DESCRIPTION

The invention relates to the use of a mixture comprising a surfactant and a cosurfactant in the form of an aqueous solution for flooding underground deposits of hydrocarbons, and a process.

In the known techniques for the recovery of hydrocarbons from underground deposits (mineral oil production), usually only a part of the mineral oil present in the deposit can be recovered. After exploratory drilling of a new deposit, the mineral oil is as a rule recovered under the natural pressure in the deposit. This is the so-called primary production. If the deposit pressure declines, it can then also be increased again or maintained by forcing in water. This is the so-called secondary mineral oil production. However, even by means of secondary production, a considerable part of the mineral oil cannot be removed from the reservoir rock. Often 65% or more of the oil still remain in the deposit after primary and secondary production.

It is known that the yield can be further increased by tertiary oil production measures. An overview of tertiary oil production is to be found, for example, in Journal of Petroleum Science and Engineering 19 (1998) 265-280. Tertiary oil production includes, for example, hot processes in which hot water or superheated steam (so-called "steam flooding") is forced into the deposit. This reduces the viscosity of the oil. Gases, such as $CO_2$ or nitrogen, can also be used as flooding medium. Processes in which suitable chemicals are used as assistants are furthermore known. For example, viscosity-increasing polymers can be added to the aqueous phase. As a result of this, the viscosity of the aqueous phase is matched with that of the oil phase and the oil can be more easily displaced by the aqueous phase from the porous formation. This technique is known as so-called "polymer flooding".

It is furthermore known that the production yield depends substantially on two contradictory forces, in particular on viscosity forces and capillary forces, which are usually expressed as capillarity number $N_c$, where $$N_c = \frac{\mu v}{\gamma \cos\theta}.$$

Here, $\mu$ is the viscosity of the fluid mobilizing mineral oil, $v$ is the Darcy velocity (flow-through per unit area), $\gamma$ is the interfacial tension between liquid mobilizing mineral oil mineral oil and $\theta$ is the contact angle between mineral oil and liquid mobilizing mineral oil (cf.: Moore and Slobod, 1959, after D. O, Shah: Surface Phenomena in Enhanced Oil Recovery).

It is known that the capillarity number is in the region of about $10^{-6}$ after the secondary mineral oil production and that it is necessary to increase the capillarity number to about $10^{-3}$ to $10^{-2}$ in order to mobilize additional mineral oil by tertiary measures. For example, the interfacial tension between mineral oil and phase mobilizing mineral oil, $\sigma$, can be reduced for this purpose by adding surfactants (so-called "surfactant flooding").

It was an object of the invention to provide a process for mobilizing and recovering hydrocarbons from underground deposits by surfactant flooding, in which the concentration of surfactant in the surfactant flood is reduced compared with known surfactant flooding while the efficiency remains the same, and which is thus more economical.

It was also an object of the invention to provide the use for mixtures comprising a surfactant and a cosurfactant, according to which the same efficiency of surfactant flooding for recovering hydrocarbons from underground deposits is ensured at lower concentration of surfactant compared with known surfactant flooding.

The object is achieved by the use of a liquid mixture comprising a surfactant and a cosurfactant for flooding underground deposits of hydrocarbons for mobilizing and recovering the hydrocarbons from the underground deposits, the cosurfactant being a substance or a group of substances selected from the following list:

an amphiphilic comb polymer having a backbone with two or more side chains attached to the backbone, the side chains differing from one another and/or the side chains differing from the backbone in their amphiphilic character, an amphiphilic polymer having one or more hydrophobic subunits [$A_2$] based on a polyisobutene block, at least 50 mol % of whose polyisobutene macromolecules have terminally arranged double bonds, and one or more hydrophilic subunits [$B_2$], or an amphiphilic polymer having the general structural formula

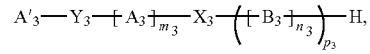

where $A'_3$ is a straight-chain or branched alkyl, cycloalkyl, aryl or aralkyl radical having 1 to 60 carbon atoms, $Y_3$ is S or O, $A_3$ is a structural unit having the formula

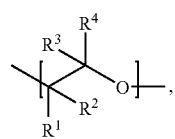

in which
R$^1$, R$^2$, R$^3$ and R$^4$, independently of one another, are the substituents hydrogen, methyl, ethyl, n-propyl, isopropyl, octyl or phenyl, with the restriction that not more than three of the substituents R$^1$, R$^2$, R$^3$ and R$^4$ are hydrogen,
m$_3$ is a consecutive number in the range from 10 to 300,
X$_3$ is a structural unit having the formula

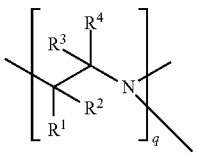

in which the substituents
R$^1$, R$^2$, R$^3$ and R$^4$, independently of one another, are each hydrogen, methyl, ethyl, n-propyl, isopropyl, octyl or phenyl,
q=0 or q=1,
B$_3$ is a monomeric subunit based on ethylene oxide or a mixture of ethylene oxide and propylene oxide,
n$_3$ is a consecutive number in the range from 20 to 500 and p=q+1.

Here, the terms a surfactant and a cosurfactant are also understood in each case as meaning a mixture of surfactants and a mixture of cosurfactants, respectively.

It was surprisingly found that cosurfactants which have the structure of comb polymers are particularly suitable for the use according to the invention.

Difference in amphiphilic character is understood here as meaning that the side chains differ from one another and/or from the backbone with regard to their affinity to polar and to nonpolar phases.

The backbone of the comb polymer is preferably hydrophobic and all side chains of the comb polymer are hydrophilic. It is particularly advantageous if the monomer A present in the backbone itself carries a side chain which differs in its amphiphilic character preferably from the side chains attached to A'.

The comb polymer is preferably formed from repeating structural units [A$_1$]n$_1$, [A'$_1$]m$_1$ and [X$_1$]l$_1$, the structural units $[A_1]_{n_1}$ and $[A'_1]_{m_1}$ forming the backbone and the structural unit $[A'_1]_{m_1}$ having an anchor function for binding the structural units $[X_1]_{l_1}$ forming the side chains, and the variables n, m and l being mole fractions, where $n_1+m_1+l_1=1$, $n_1 \geq m_1$ and $l_1 > m_1$.

The comb polymer is therefore a copolymer, it being possible for the structural units [A$_1$]n$_1$ and [A'$_1$]m$_1$ forming the backbone to be arranged in any desired manner, i.e. both in a strictly alternating manner (in which case the variables n and m are identical) and as block copolymers, as random copolymers or with gradients.

Examples of suitable copolymers are those as described in EP-A 0 412 389 for use as compositions for rendering leather or fur skins hydrophobic and obtainable by free radical copolymerization of $C_8$ to $C_{40}$-monoolefins, with ethylenically unsaturated $C_4$- to $C_8$-dicarboxylic anhydrides by a mass polymerization method at temperatures of from 80 to 300° C. to give copolymers having molar masses of from 500 to 20 000 g/mol, subsequent solvolysis of the anhydride groups of the copolymers and at least partial neutralization of the carboxyl groups forming in the solvolysis in an aqueous medium with bases.

The cosurfactants according to the invention preferably have molar masses in the range from 500 to 100 000 g/mol, particularly preferably in the range from 1000 to 50 000 g/mol.

The mole fractions n, m and l, independently of one another, are preferably from 0.001 to 99.9%, and preferably n is greater than or equal to m and l is greater than m. Particularly preferably, m is from 0.001 to 0.4, n is from 0.001 to 0.99 and l is from 0.2 to 0.99.

Monomers which carry one or more hydrophobic side chains may advantageously be used for the formation of the structural unit [A$_1$]n$_1$.

The monomer forming the structural unit [A$_1$]n$_1$ is advantageously a substance or a mixture of substances selected from the following list:
straight-chain or branched alkenes having 15 to 50, preferably having 20 to 35, carbon atoms per molecule, preferably α-olefins,
ethylene,
reactive polyisobutenes, formed from polyisobutene chains which still have a reactive double bond at the end or in the vicinity of the end of the polyisobutene chain,
hydrophobic vinyl or vinylidene compounds, in particular styrene, or
(meth)acrylates having hydrophobic side chains.

For the formation of the structural unit [A$_1$]n$_1$, long-chain α-olefins can therefore advantageously be used as starting materials. Also particularly advantageous is the use of reactive polyisobutenes, i.e. of polyisobutenes which are formed from chains which still have a reactive double bond at the end or in the vicinity of the end of the chain.

All abovementioned substances or mixtures of substances are industrial products and accordingly are economically available.

For the formation of the structural unit [A'$_1$]m$_1$, i.e. the structural unit which has an anchor function for binding side chains, a substance or a mixture of substances selected from the following list is preferably used:
maleic anhydride or its derivatives which preferably carry a polymerizable or alkoxylatable side chain,
vinyl alcohols or their derivatives which preferably carry a polymerizable or alkoxylatable side chain,
(meth)acrolein or
(meth)acrylic acid or its derivatives which preferably carry one or more polymerizable or alkoxylatable side chains.

The term "polymerization" or "polymerizable" is to be understood here as meaning all methods by means of which a polymeric compound can be prepared. In addition to the classical polymerization methods, in particular methods such as polycondensation and polyaddition are also to be included.

Here too, all the products are industrial products and hence economically available.

The monomer forming the structural unit [X$_1$]l$_1$ is advantageously ethylene oxide or a mixture of ethylene oxide and propylene oxide, which, for the formation of the side chains (n), is further reacted to give a hydrophilic polyethylene oxide or polyethylene oxide/polypropylene oxide block.

It is particularly advantageous to build up the structural unit $[X_1]_{l_1}$ from a mixture of ethylene oxide and propylene oxide, preferably having a proportion of from 5 to 20% of propylene oxide.

It was found that, for increasing the efficiency of surfactants, particularly effective cosurfactant structures are obtained if the hydrophilic side chains formed from ethylene oxide or ethylene oxide/propylene oxide mixtures are end-capped with hydrophobic blocks, i.e. all or some of the side chains formed from the hydrophilic ethylene oxide or ethylene oxide/propylene oxide blocks end in each case in a hydrophobic block, preferably a hydrophobic poly- or oligoalkylene oxide, or in a branched or straight $C_{10}$- to $C_{30}$-alkyl chain.

The structural units $[X_1]l_1$ forming the side chains may also be formed from a straight-chain or branched alkyl, cycloalkyl, aryl or aralkyl radical having 4 to 400 carbon atoms or a polyolefin or hydrophobic poly- or oligoalkylene oxide block.

The polyolefin block can preferably be formed from one or more of the following monomers: ethene, propene, 1-butene, 2,3-butene, 2-methyl-1,2-propene (isobutene), 1-pentene, 2,3-pentene, 2-methyl-1,2-butene, 3-methyl-1,2-butene, 2,3-hexene, 3,4-hexene, 2-methyl-1,2-pentene, 2-ethyl-1,2-butene, 3-methyl-1,2-pentene, decene, 4-methyl-1,2-pentene, styrene or a mixture of olefins from industrially available refined fraction streams.

A mixture comprising a cosurfactant is particularly preferred, the monomer forming the structural unit [A']m being maleic anhydride and the monomer forming the structural unit $[X_1]l_1$ being ethylene oxide. A further preferred mixture comprises a cosurfactant, the monomer forming the structural unit $[A'_1]m_1$ being maleimide and the side chain(s) being straight-chain or branched alkyl radicals having 3 to 20 carbon atoms or a polyethylene oxide or polyethylene oxide/polypropylene oxide block, which preferably end in a hydrophobic block, in particular a branched or straight $C_{10}$- to $C_{30}$-alkyl chain.

Also preferred is a mixture comprising a cosurfactant, the monomer forming the structural unit $[A'_1]m_1$ being vinyl alcohol and the monomer X being (meth)acrylic acid or ethylene oxide or a mixture of ethylene oxide and propylene oxide.

More preferably, the monomer forming the structural unit $[A'_1]m_1$ is a vinyl alcohol derivative having a polymerizable side chain and the monomer forming the structural unit $[X_1]l_1$ is vinylpyrrolidone, (meth)acrylic acid or vinyl alcohol.

It is not necessary for all structural units $A'_1$ having an anchor function also to be actually functionalized with a side chain in each case. The invention also comprises comb polymers which still comprise free anchor groups, the anchor groups either not having been reacted or having been protected before the reaction. It is thus possible to synthesize a polymer having a density of side chains which is suitable for the specific application by appropriate functionalization of only some of the structural units $A'_1$ having an anchor function.

Where the monomer forming the structural unit $[A'_1]m_1$ is maleic anhydride, the maleic anhydride units which carry no side chain may be present as anhydride, as mono- or diester, as amide or imide, as free acid and in partly or completely neutralized form.

When the monomer forming the structural unit [A']m is vinyl alcohol, the vinyl alcohol groups carrying no side chains may be present as free alcohol or as vinyl acetate.

If the monomer forming the structural unit $[A'_1]m_1$ is (meth)acrylate, the unfunctionalized (meth)acrylate units may be present as ester, as amide, as free acid and in partly or completely neutralized form.

A cosurfactant which is an amphiphilic polymer having one or more hydrophobic subunits ($A_2$) and one or more hydrophilic subunits ($B_2$), wherein one or more hydrophobic subunits ($A_2$) are formed from a polyisobutene block, at least 50 mol % of whose polyisobutene macromolecules have terminally arranged double bonds, is furthermore particularly suitable for the use according to the invention.

Every hydrophobic subunit is preferably formed from a polyisobutene block.

Polyisobutenes which correspond to the above definition, i.e. at least 50 mol % of which are formed from macromolecules having terminally arranged double bonds, are referred to as so-called reactive polyisobutenes. The term terminally arranged double bonds is understood as meaning both β-olefinic (vinyl) double bonds —[—CH=C(CH$_3$)$_2$] and α-olefinic (vinylidene) double bonds —[—C(CH$_3$)=CH$_2$]. Preferred reactive polyisobutenes are those in which at least 60 mol %, preferably at least 80 mol %, of the polyisobutene macromolecules, based on the total number of polyisobutene macromolecules, have terminally arranged double bonds.

Suitable reactive polyisobutenes can be obtained, for example, by cationic polymerization of isobutene.

For the synthesis of suitable polyisobutenes, pure isobutene is preferably used. However, it is also possible in addition to use cationically polymerizable comonomers. However, the amount of comonomers should as a rule be less than 20% by weight, preferably less than 10% by weight and in particular less than 5% by weight.

Particularly suitable cationically polymerizable comonomers are vinylaromatics, such as styrene and α-methylstyrene, $C_1$-$C_4$-alkylstyrenes and 2-, 3- and 4-methylstyrene and 4-tert-butylstyrene, $C_3$- to $C_6$-alkenes, such as n-butene, isoolefins having 5 to 10 carbon atoms, such as 2-methylbut-1-ene, 2-methylpent-1-ene, 2-methylhex-1-ene, 2-ethylpent-1-ene, 2-ethylhex-1-ene and 2-propylhept-1-ene.

Suitable isobutene-containing feedstock for the process according to the invention are both isobutene itself and isobutene-containing $C_4$-hydrocarbon streams, for example refined $C_4$ fractions, $C_4$ cuts from isobutane dehydrogenation, $C_4$ cuts from steam crackers or so-called FCC crackers (FCC: fluid catalyzed cracking), provided that they have been substantially freed from 1,3-butadiene present therein. Typically, the concentration of isobutene in $C_4$-hydrocarbon streams is in the range from 40 to 60% by weight.

Suitable $C_4$-hydrocarbon streams should as a rule comprise less than 500 ppm, preferably less than 200 ppm, of 1,3-butadiene. The presence of but-1-ene and cis- and trans-but-2-ene is substantially noncritical for the polymerization and does not lead to losses of selectivity.

When $C_4$-hydrocarbon streams are used as feedstock, the hydrocarbons other than isobutene play the role of an inert solvent or are incorporated as comonomer in the form of polymerized units.

Suitable solvents are all organic compounds which are liquid in the chosen temperature range for the preparation of the polyisobutenes and neither eliminate protons nor have free electron pairs.

In particular, cyclic and acyclic alkanes, such as ethane, isopropane, n-propane and n-butane and its isomers, cyclopentane and n-pentane and its isomers, cyclohexane and n-hexane and its isomers, n-heptane and its isomers and higher homologs, cyclic and acyclic alkenes, such as ethene, isopropene, n-propene, n-butene, cyclopentene and n-pentene, cyclohexene and n-hexene, n-heptene, aromatic hydrocarbons, such as benzene, toluene or isomeric xylenes, may be mentioned. The hydrocarbons may also be halogenated. Examples of halogenated hydrocarbons comprise methyl chloride, methyl bromide, methylene chloride, methylene bromide, ethyl chloride, ethyl bromide, 1,2-dichloroethane, 1,1,1-trichloroethane, chloroform or chlorobenzene. Mixtures of the solvents may also be used, provided that no undesired properties occur.

It is particularly advisable with regard to process engineering to use solvents which boil in the desired temperature range. The polymerization is usually effected at from −80° C. to 0° C., preferably from −50° C. to −5° C. and particularly preferably at from −30° C. to −15° C.

Pure $BF_3$, its complexes with electron donors or mixtures thereof may be used as the catalyst. Electron donors (Lewis bases) are compounds which have a free electron pair, for example on an O, N, P or S atom, and can form complexes with Lewis acids. This complex formation is desired in many cases since the activity of the Lewis acid is thus reduced and secondary reactions are suppressed. Examples of suitable electron donors are ethers, such as diisopropyl ether or tetrahydrofuran, amines, such as triethylamine, amides, such as dimethylacetamide, alcohols, such as methanol, ethanol, isopropanol or tert-butanol. The alcohols also act as a proton source and thus initiate the polymerization. A cationic polymerization mechanism may also become active through protons from ubiquitous traces of water.

In the cationic polymerization under $BF_3$ catalysis, substantially linear polyisobutenes having a particularly high content of α-olefin groups at a chain end are obtained. When the reaction is effected in a suitable manner, the α-olefin content is not less than 80%.

Reactive polyisobutenes which have reactive α-olefin groups at both chain ends or which are branched can be particularly elegantly obtained by means of living cationic polymerization. However, linear polyisobutenes which have an α-olefin group only at one chain end can also be synthesized by this method.

In the living cationic polymerization, isobutene is polymerized with a suitable combination of an initiator molecule $IX_n$ with a Lewis acid S. Details of this method of polymerization are disclosed, for example, in Kennedy and Ivan, "Carbocationic Macromolecular Engineering", Hanser Publishers 1992.

Suitable initiator molecules $IX_n$ have one or more leaving groups X. The leaving group X is a Lewis base which may also be further substituted. Examples of suitable leaving groups comprise the halogens fluorine, chlorine, bromine and iodine, straight-chain and branched alkoxy groups, such as $C_2H_5O$—, n-$C_3H_7O$—, i-$C_3H_7O$—, n-$C_4H_9O$—, i-$C_4H_9O$—, sec-$C_4H_9O$— or t-$C_4H_9O$—, and straight-chain or branched carboxyl groups, such as $CH_3CO$—O—, $C_2H_5CO$—O—, n-$C_3H_7CO$—O—, i-$C_3H_7CO$—O—, n-$C_4H_9CO$—O—, i-$C_4H_9CO$—O—, sec-$C_4H_9CO$—O— or t-$C_4H_9CO$—O—. Associated with the leaving group or groups is the molecular moiety I, which can form sufficiently stable carbocations $I^+$ under reaction conditions. For initiating the polymerization, the leaving group is abstracted by means of a suitable Lewis acid S: I—X+S→$I^+$+$XS^-$ (shown here only for the case n=1). The resulting carbocation $I^+$ initiates the cationic polymerization and is incorporated into the resulting polymer. Suitable Lewis acids S are, for example, $AlY_3$, $TiY_4$, $BY_3$, $SnY_4$, $ZnY_2$, where Y is fluorine, chlorine, bromine or iodine. The polymerization reaction can be stopped by destroying the Lewis acid, for example by the reaction thereof with alcohol. The result is the formation of polyisobutene which has terminal —$C(CH_3)_2$—Z groups which can subsequently be converted into terminal α- and β-olefin groups.

Structures which can form tertiary carbocations are preferred as the initiator molecule. Particularly preferred are radicals which are derived from the lower oligomers of isobutene H—[$CH_2$—$C(CH_3)_2$]$_n$—X, where n is preferably from 2 to 5. Linear reactive polyisobutenes formed using such initiator molecules have a reactive group only at one end.

Linear polyisobutenes which have reactive groups at both ends can be obtained by using initiator molecules IXQ which have two leaving groups X and Q, where X and Q may be identical or different. In industry, compounds which comprise —$C(CH_3)_2$—X groups have proven useful. Examples comprise straight-chain or branched alkylene radicals $C_nH_{2n}$ (where n may preferably assume values of from 4 to 30), which may also be interrupted by a double bond or an aromatic, such as X—$(CH_3)_2$C—$CH_2$—$C(CH_3)_2$-Q, X—$(CH_3)_2$C—$CH_2$—$C(CH_3)_2CH_2$—$C(CH_3)_2$-Q, X—$(CH_3)_2$C—$CH_2$—$C(CH_3)_2CH_2$—$C(CH_3)_2CH_2$—$C(CH_3)_2$-Q or X—$(CH_3)_2$C—$CH_2$—$C(CH_3)_2CH_2$—$C(CH_3)_2CH_2$—$C(CH_3)_2$—$CH_2$—$C(CH_3)_2$-Q, X—$(CH_3)_2$C—CH=CH—$C(CH_3)_2$-Q or para and/or meta X—$(CH_3)_2$C—$C_6H_4$—$C(CH_3)_2$-Q.

Branched polyisobutenes can be obtained by using initiator molecules $IX_n$ which have 3 or more leaving groups, it being possible for the leaving groups to be identical or different. Examples of suitable initiator molecules comprise X—$(CH_3)_2$ C—$C_6H_3$—[$C(CH_3)_2$-Q]-$C(CH_3)_2$—P as 1,2,4- and/or 1,3,5-isomer, where the leaving groups are preferably identical but may also be different. Further examples of mono-, di-, tri- or polyfunctional initiator molecules are to be found in the work by Kennedy and Ivan cited at the outset and in the literature cited there.

Suitable polyisobutenes are, for example, the Glissopal® brands from BASF AG, for example Glissopal 550, 1000, 1300 or 2300, and the Oppanol® brands from BASF AG, such as Oppanol B10 or B12.

Cosurfactants which have a polyisobutene block having a number average molecular weight $M_n$ in the range from 200 to 20 000 Dalton, preferably in the range from 200 to 5000 Dalton, are particularly suitable for the mixture according to the invention.

Depending on the polymerization process, the polydispersity index (PDI), i.e. the ratio of weight average to number average molecular weight, of the polyisobutenes which can preferably be used is in the range from 1.05 to 10, preferably in the range from 1.05 to 5, particularly preferably in the range from 1.05 to 2.0.

The method for determining the polydispersity (PDI) and for the number average and weight average molecular weight is described, for example, in Analytiker-Taschenbuch, Volume 4, pages 433 to 442, Berlin 1984.

The invention is in principle not limited with regard to the one or more hydrophilic subunits which can be used for the formation of the cosurfactant.

Subunits which are particularly readily soluble in water and particularly poorly soluble in oil are particularly advantageous.

One or more hydrophilic subunits ($B_2$) are preferably formed from repeating ethylene oxide or ethylene oxide/propylene oxide units, preferably having a proportion of from 0 to 50% of propylene oxide units, particularly preferably having a proportion of from 5 to 20% of propylene oxide units. This may be a random copolymer, a gradient copolymer, an alternating or a block copolymer of ethylene oxide and propylene oxide.

One or more hydrophilic subunits (B₂) are more preferably formed from monomer units selected from the following group: (meth)acrylic acid, also partly or completely neutralized, (meth)acrylates, vinyl acetate, vinyl alcohol, vinylpyrrolidone, polyallyl alcohol and hydrophilic derivatives of the abovementioned monomer units, or from mixtures thereof.

The hydrophobic and hydrophilic subunits forming the amphiphilic polymer are preferably linked by functionalizing the polyisobutene block, which forms the basis of the hydrophobic subunit(s), with introduction of polar groups, and then, if appropriate, further modifying the functionalized polyisobutene block.

The degree of functionalization of the modified polyisobutene derivatives with terminal, polar groups is at least 65%, preferably at least 75% and very particularly preferably at least 85%. In the case of the polymers having polar groups only at one chain end, this statement relates only to this one chain end. In the case of the polymers having polar groups at both chain ends and the branched products, this statement relates to the total number of chain ends. The unfunctionalized chain ends are both those which have no reactive group at all and those which have a reactive group but this was not reacted in the course of the functionalization reaction.

The term "polar group" is known to the person skilled in the art. The polar groups may be both protic and aprotic polar groups. The modified polyisobutenes thus have a hydrophobic molecular moiety comprising a polyisobutene radical and a molecular moiety which has at least a certain hydrophilic character, comprising terminal polar groups. They are preferably strongly hydrophilic groups. The terms "hydrophilic" and "hydrophobic" are known to the person skilled in the art.

Polar groups comprise, for example, sulfo radicals, carboxylic anhydrides, carboxyl groups, carboxamides, carboxylic esters, phosphonic acid groups, phosphonic esters and phosphonamides, hydroxyl groups, arylhydroxyl groups, arylphosphoric esters, arylsulfuric esters, polyoxyalkylene groups, polyoxyalkylene esters of said acid groups, amino groups, polyethylenimino group, amides of polyethylenimines of said acids or epoxides, which may also be suitably substituted.

Suitable reactions for introducing polar groups (functionalization) are known in principle to the person skilled in the art.

In principle, the functionalization of the polyisobutenes used according to the invention can be carried out in one or more stages.

In a preferred embodiment, the functionalization of the polyisobutene used according to the invention is effected in one or more stages and is selected from:
i) reaction with aromatic hydroxy compounds in the presence of an alkylation catalyst to give aromatic hydroxy compounds alkylated with polyisobutenes,
ii) reaction of the polyisobutene block with a peroxy compound to give an epoxidized polyisobutene,
iii) reaction of the polyisobutene block with an alkene which has a double bond substituted by electron-attracting groups (enophile), in an ene reaction,
iv) reaction of the polyisobutene block with carbon monoxide and hydrogen in the presence of a hydroformylation catalyst to give a hydroformylated polyisobutene,
v) reaction of the polyisobutene block with a phosphorus halide or a phosphorus oxychloride to give a polyisobutene functionalized with phosphonyl groups,
vi) reaction of the polyisobutene block with a borane and subsequent oxidative cleavage to give a hydroxylated polyisobutene,
vii) reaction of the polyisobutene block with an SO₃ source, preferably acetyl sulfate or oleum, to give a polyisobutene having terminal sulfo groups,
viii) reaction of the polyisobutene block with oxides of nitrogen and subsequent hydrogenation to give a polyisobutene having terminal amino groups.

Re i): Alkylation of Aromatic Hydroxy Compounds

For the derivatization, the reactive polyisobutene can be reacted with an aromatic hydroxy compound in the presence of an alkylation catalyst. Suitable catalysts and reaction conditions of this so-called Friedel-Crafts alkylation are described, for example, in J. March, Advanced Organic Chemistry, 4th Edition, Verlag John Wiley & Sons, pages 534-539, which is hereby incorporated by reference.

The aromatic hydroxy compound used for the alkylation is preferably selected from phenolic compounds having 1, 2 or 3 OH groups, which, if appropriate, may have at least one further substituent. Preferred further substituents are $C_1$-$C_8$-alkyl groups, in particular methyl and ethyl. Compounds of the general formula

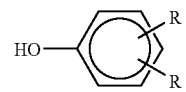

where $R^1$ and $R^2$, independently of one another, are hydrogen, OH or $CH_3$, are particularly preferred. Phenol, the cresol isomers, catechol, resorcinol, pyrogallol, fluoroglucinol and the xylenol isomers are particularly preferred. In particular, phenol, o-cresol and p-cresol are used. If desired, mixtures of the abovementioned compounds may also be used for the alkylation.

The catalyst is preferably selected from Lewis acid alkylation catalysts, which are understood in the context of the present Application as meaning both individual acceptor atoms and acceptor-ligand complexes, molecules, etc., provided that they have overall (externally) Lewis acid (electron acceptor) properties. These include, for example, $AlCl_3$, $AlBr_3$, $BF_3$, $BF_3 2C_6H_5OH$, $BF_3[O(C_2H_5)_2]_2$, $TiCl_4$, $SnCl_4$, $AlC_2H_5Cl_2$, $FeCl_3$, $SbCl_5$ and $SbF_5$. These alkylation catalysts can be used together with a cocatalyst, for example an ether, Suitable ethers are di($C_1$-$C_8$-alkyl)ethers, such as dimethyl ether, diethyl ether and di-n-propyl ether, and tetrahydrofuran, di($C_5$-$C_8$-cycloalkyl)ethers, such as dicyclohexyl ether, and ethers having at least one aromatic hydrocarbon radical, such as anisole. If a catalyst-cocatalyst complex is used for the Friedel-Crafts alkylation, the molar ratio of catalyst to cocatalyst is preferably in a range from 1:10 to 10:1. The reaction can also be catalyzed with protic acids, such as sulfuric acid, phosphoric acid or trifluoromethanesulfonic acid. Organic protic acids may also be present in a form bound in a polymer, for example as ion exchange resin.

The alkylation can be carried out in the absence of a solvent or in a solvent. Suitable solvents are, for example, n-alkanes and mixtures thereof and alkylaromatics, such as toluene, ethylbenzene and xylene, and halogenated derivatives thereof.

The alkylation is preferably carried out at temperatures of from −10° C. to +100° C. The reaction is usually carried out at atmospheric pressure but can also be carried out at higher or lower pressures.

By a suitable choice of the molar ratios of aromatic hydroxy compounds to polyisobutene and the catalyst, the intended proportion of alkylated products and the degree of alkylation thereof can be established. Thus, for example, substantially monoalkylated polyisobutenylphenols are generally obtained with an excess of phenol or in the presence of a Lewis acid alkylation catalyst if an ether is additionally used as cocatalyst.

The reaction of polyisobutenes with phenols in the presence of suitable alkylation catalysts is disclosed, for example, in U.S. Pat. No. 5,300,701 and WO 02/26840.

For the further functionalization, a polyisobutenylphenol obtained in step i) can be subjected to a reaction in the context of a Mannich reaction with at least one aldehyde, for example formaldehyde, and at least one amine which has at least one primary or secondary amine function, a compound alkylated with polyisobutene and additionally at least partly aminoalkylated being obtained. Reaction products and/or condensates of aldehyde and/or amine can also be used. The preparation of such compounds is described in WO 01/25 293 and WO 01/25 294, which are hereby incorporated by reference in their entirety.

Furthermore, a polyisobutenylphenol obtained in step i) can be alkoxylated with alkylene oxides, preferably ethylene oxide. In addition to ethylene oxide, the following pure alkylene oxides or mixtures can be used: propene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 2,3-hexene oxide, 3,4-hexene oxide, 2-methyl-1,2-pentene oxide, 2-ethyl-1,2-butene oxide, 3-methyl-1,2-pentene oxide, decene oxide, 4-methyl-1,2-pentene oxide, styrene oxide or a mixture of oxides from industrially available refined fraction streams.

In a further embodiment, the polyisobutenylphenols obtained are reacted with phosphorus oxychloride to give the aromatic phosphorus monoester. This is reacted in a subsequent step with polyethylenimines, alkylene oxides or polyalkylene oxides.

ii) Epoxidation

For the functionalization, the reactive polyisobutene can be reacted with at least one peroxy compound to give an epoxidized polyisobutene. Suitable epoxidation processes are described in J. March, Advanced Organic Chemistry, 4th Edition, Verlag John Wiley & Sons, pages 826-829, which is hereby incorporated by reference. At least one peracid, such as m-chloroperbenzoic acid, performic acid, peracetic acid, trifluoroperacetic acid, perbenzoic acid and 3,5-dinitroperbenzoic acid, is preferably used as the peroxy compound. The preparation of the per acids can be effected in situ from the corresponding acids and $H_2O_2$, if appropriate in the presence of mineral acids. Further suitable epoxidation reagents are, for example, alkaline hydrogen peroxide, molecular oxygen and alkyl peroxides, such as tert-butyl hydroperoxide. Suitable solvents for the epoxidation are, for example, conventional, nonpolar solvents. Particularly suitable solvents are hydrocarbons, such as toluene, xylene, hexane or heptane.

For the further functionalization, the epoxidized polyisobutenes which are obtained in step ii) can be reacted with ammonia, polyisobuteneaminoalcohols being obtained (EP-A 0 476 785).

In a further step, the epoxidized polyisobutenes obtained are reacted with said alkylene oxides. Ethylene oxide is preferred here.

iii) Ene Reaction

For the functionalization, the reactive polyisobutene can furthermore be reacted with at least one alkene which has an electron-poor double bond in an ene reaction (cf. for example DE-A 4 319 672 or H. Mach and P. Rath in "Lubrication Science II" (1999), pages 175-185, which is hereby incorporated by reference in its entirety). In the ene reaction, an alkene referred to as ene and having an allyl hydrogen atom is reacted with an electron-poor alkene, the so-called enophile, in a pericyclic reaction comprising a carbon-carbon linkage, a double bond shift and a hydrogen transfer. Here, the reactive polyisobutene reacts as an ene. Suitable enophiles are compounds as also used as dienophiles in the Diels-Alder reaction. Suitable enophiles are fumaroyl dichloride, fumaric acid, maleoyl dichloride, maleic anhydride and maleic acid, preferably maleic anhydride and maleic acid. Maleic anhydride is very particularly preferably used as the enophile. Polyisobutenes functionalized with succinic anhydride groups (polyisobutenylsuccinic anhydride, PIBSA), as disclosed in EP-A 0 156 310, result.

The ene reaction can, if appropriate, be carried out in the presence of a Lewis acid as the catalyst. For example, aluminum chloride and ethylaluminum chloride are suitable.

In the reaction, a new α-olefin group is produced at the chain end. For the further functionalization, for example, a polyisobutene derivatized with succinic anhydride groups can be subjected to a subsequent reaction which is selected from:
a) reaction with at least one amine to give a polyisobutene at least partly functionalized with succinimide groups and/or succinamide groups,
b) reaction with at least one alcohol to give a polyisobutene functionalized with succinic ester groups,
c) reaction with at least one alkylene oxide to give a polyisobutene functionalized with two succinic ester groups (persuccinic anhydride group),
d) reaction with maleic anhydride to give a product having two succinic anhydride groups at the chain end (so-called PIBSA),
e) hydrolysis to give a polyisobutene functionalized with succinic acid groups, the succinic acid groups being reacted with alkylene oxides as under c),
f) if free carboxyl groups are still present after the reaction of the succinic anhydride group, they can also be converted into salts. Suitable cations in salts are especially alkali metal cations, ammonium ions and alkylammonium ions.

Re a) and b)

For the further derivatization, the succinic anhydride groups can, for example, be reacted with polar reactants, such as alcohols or amines. Suitable polar reactants are preferably primary alcohols ROH or primary amines $RNH_2$ or secondary amines RR'NH, where R is a linear or branched saturated hydrocarbon radical which carries at least one substituent selected from the group consisting of OH, $NH_2$ or $NH_3^+$ and, if appropriate, one or more CH(O) groups and, if appropriate, has normeighboring —O— and/or —NH— and/or tertiary —N— groups, and R', independently of R, has the same meaning. Here, both carboxyl groups of the succinic anhydride may react or only one group may react while the other carboxyl group is present as a free acid group or as a salt. The above substituents may also be further modified, for example by alkoxylation.

Further synthesis variants for the derivatization of succinic anhydride groups are mentioned in the Applications having the application numbers DE 101 251 58.0 and DE 101 476 50.7.

It is also known to the person skilled in the art that a succinic anhydride group can be converted under suitable conditions into a succinimide group.

In a further embodiment, reactive polyisobutene can be subjected to free radical copolymerization with maleic anhydride (cf. WO 95/07944, WO 01/55059, WO 90/03359). The strictly alternating copolymers thus obtained can be further reacted as described above. The reactions with alkylene oxides, polyalkylene oxides or polyethylenimines are preferred.

iv) Hydroformylation

For the functionalization, the reactive polyisobutene can be subjected to a reaction with carbon monoxide and hydrogen in the presence of a hydroformylation catalyst, a hydroformylated polyisobutene being obtained.

Suitable catalysts for the hydroformylation are known and preferably comprise a compound or a complex of an element of subgroup VIII of the Periodic Table of the Elements, such as Co, Rh, Ir, Ru, Pd or Pt. For influencing the activity and/or selectivity, hydroformylation catalysts modified with N- or P-containing ligands are preferably used. Suitable salts of these metals are, for example, the hydrides, halides, nitrates, sulfates, oxides, sulfides or the salts with alkyl- or arylcarboxylic acids or alkane- or arylsulfonic acids. Suitable complex compounds have ligands which are selected, for example, from halides, amines, carboxylates, acetylacetonate, aryl- or alkanesultonates, hydride, CO, olefins, dienes, cycloolefins, nitriles, N-containing heterocycles, aromatics and heteroaromatics, ethers, $PF_3$, phospholes, phosphabenzenes and mono-, bi- and polydentate phosphine, phosphinite, phosphonite, phosphoramidite and phosphite ligands.

In general, catalytically active species of the general formula $H_xM_y(CO)_zL_q$, where M is a metal of subgroup VIII, L is a ligand and q, x, y and z are integers dependent on the valency and type of the metal and the coordination number of the ligand L, are formed under hydroformylation conditions from the catalysts or catalyst precursors used in each case.

According to a preferred embodiment, the hydroformylation catalysts are prepared in situ in the reactor used for the hydroformylation reaction.

Another preferred form is the use of a carbonyl generator in which carbonyl produced beforehand is adsorbed, for example onto active carbon, and only the desorbed carbonyl is fed to the hydroformylation but not the salt solutions from which the carbonyl is produced.

Rhodium compounds or complexes suitable as catalysts are, for example, rhodium(II) and rhodium(III) salts, such as rhodium(III) chloride, rhodium(III) nitrate, rhodium(III) sulfate, potassium rhodium sulfate, rhodium(II) or rhodium(III) carboxylate, rhodium(II) and rhodium(III) acetate, rhodium (III) oxide, salts of rhodium(III) acid, trisammonium hexachlororhodate(III), etc. Rhodium complexes, such as biscarbonylrhodium acetylacetonate, acetylacetonatobisethylenerhodium(I), etc., are furthermore suitable.

Also suitable are ruthenium salts or compounds. Suitable ruthenium salts are, for example, ruthenium(III) chloride, ruthenium(IV), ruthenium(VI) or ruthenium(VII) oxide, alkali metal salts of the ruthenium oxyacids, such as $K_2RuO_4$ or $KRuO_4$, or complex compounds, such as, for example, $RuHCl(CO)(PPh_3)_3$. The metal carbonyls of ruthenium, such as trisrutheniumdodecacarbonyl and hexarutheniumoctadecacarbonyl, or mixed forms in which CO is partly replaced by ligands of the formula $PR_3$, such as $Ru(CO)_3(PPh_3)_2$, can also be used.

Suitable cobalt compounds are, for example, cobalt(II) chloride, cobalt(II) sulfate, cobalt(II) carbonate, cobalt(II) nitrate, the amine or hydrate complexes thereof, cobalt carboxylates, such as cobalt formate, cobalt acetate, cobalt ethylhexanoate, cobalt naphthanoate, and the cobalt-caprolactamate complex. Here too, the carbonyl complexes of cobalt, such as dicobaltoctacarbonyl, tetracobaltdodecacarbonyl and hexacobalthexadecacarbonyl, can be used.

Said compounds and further suitable compounds are in principle known and are sufficiently described in the literature.

Suitable activating agents which can be used for the hydroformylation are, for example, Brönsted acids, Lewis acids, such as $BF_3$, $AlCl_3$ and $ZnCl_2$, and Lewis bases.

The composition of the synthesis gas used, comprising carbon monoxide and hydrogen, can be varied within wide ranges. The molar ratio of carbon monoxide to hydrogen is as a rule from about 5:95 to 95:5, preferably from about 40:60 to 60:40. The temperature during the hydroformylation is in general in a range of from about 20 to 200° C., preferably from about 50 to 190° C. The reaction is carried out as a rule at the partial pressure of the reaction gas at the chosen reaction temperature. In general, the pressure is in a range from about 1 to 700 bar, preferably from 1 to 300 bar.

The carbonyl number of the hydroformylated polyisobutenes obtained depends on the number average molecular weight $M_n$. Products having a number average molecular weight $M_n$ of 10 000 Dalton preferably have carbonyl numbers of from 2 to 5.6 mg KOH/g, in particular from 3.6 to 5.6 mg KOH/g. Products having a number average molecular weight $M_n$ of 40 000 Dalton have carbonyl numbers of from 0.5 to 1.4 mg KOH/g, in particular from 0.9 to 1.4 mg KOH/g. The carbonyl numbers of products having other molecular weights can be determined by interpolation or extrapolation.

The predominant part of the double bonds present in the medium molecular weight, reactive polyisobutene used is preferably converted into aldehydes by the hydroformylation. By using suitable hydroformylation catalysts and/or an excess of hydrogen in the synthesis gas used, the predominant part of the ethylenically unsaturated double bonds present in the starting material can also be converted directly into alcohols (cf. for example DE-A 100 03 105). This can also be effected in a two-stage functionalization according to reaction step B) described below.

The functionalized polyisobutenes obtained by hydroformylation are advantageously suitable as intermediates for further processing by functionalization of at least a part of the aldehyde functions present in them.

A) Oxocarboxylic Acids

For the further functionalization, the hydroformylated polyisobutenes obtained in step iv) can be reacted with an oxidizing agent to give a polyisobutene at least partly functionalized with carboxyl groups.

For the oxidation of aldehydes to carboxylic acids, it is possible in general to use a large number of different oxidizing agents and oxidation processes, which are described, for example, in J. March, Advanced Organic Chemistry, Verlag John Wiley & Sons, 4th Edition, page 701 et seq. (1992). These include, for example, the oxidation with permanganate, chromate, atmospheric oxygen, etc. The oxidation with air/oxygen can be effected both catalytically in the presence of metal salts and in the absence of catalysts. Preferably used metals are those which are capable of a valency change, such as Cu, Fe, Co, Mn, etc. The reaction also takes place as a rule in the absence of a catalyst. In the case of atmospheric oxidation, the conversion can easily be controlled by means of the duration of the reaction.

According to a further embodiment, the oxidizing agent used is an aqueous hydrogen peroxide solution in combination with a carboxylic acid, such as, for example, acetic acid. The acid number of the polyisobutenes having a carboxyl function which are obtained depends on the number average molecular weight $M_n$. Products having a number average molecular weight $M_n$ of 10 000 Dalton preferably have acid numbers of from 2 to 5.6 mg KOH/g, in particular from 3.6 to 5.6 mg KOH/g. Products having a number average molecular weight $M_n$ of 40 000 Dalton have acid numbers of from 0.5 to 1.4 mg KOH/g, in particular from 0.9 to 1.4 mg KOH/g. The acid numbers of products having other molecular weights can be determined by interpolation or extrapolation.

The polyisobutenes having a carboxyl function which are obtained can be reacted in a further reaction step. Reactions may be those with alkylene oxides, esterifications with polyalkylene oxides or amide formation with polyethylenimines.

B) Oxo Alcohols

According to a further suitable embodiment, the hydroformylated polyisobutenes obtained in step iv) can be subjected to a reaction with hydrogen in the presence of a hydrogenation catalyst to give a polyisobutene which is at least partly functionalized with alcohol groups.

Suitable hydrogenation catalysts are in general transition metals, such as Cr, Mo, W, Fe, Rh, Co, Ni, Pd, Pt, Ru, etc., or mixtures thereof, which, in order to increase the activity and stability, can be applied to supports, such as active carbon, alumina, kieselguhr, etc. In order to increase the catalytic activity, Fe, Co and preferably Ni, also in the form of the Raney catalysts, can be used as metal sponge having a very large surface area.

The hydrogenation of the oxo aldehydes from stage iv) is effected, depending on the activity of the catalyst, preferably at elevated temperatures and superatmospheric pressure. The reaction temperature is preferably from about 80 to 150° C. and the pressure from about 50 to 350 bar.

The alcohol number of the resulting polyisobutenes having hydroxyl groups depends on the number average molecular weight $M_n$. Products having a number average molecular weight $M_n$ of 10 000 Dalton preferably have alcohol numbers of from 2 to 5.6 mg KOH/g, in particular from 3.6 to 5.6 mg KOH/g. Products having a number average molecular weight $M_n$ of 40 000 Dalton have alcohol numbers of from 0.5 to 1.4 mg KOH/g, in particular from 0.9 to 1.4 mg KOH/g. The alcohol numbers of products having other molecular weights can be determined by interpolation or extrapolation.

The polyisobutenes functionalized with alcohol groups can additionally be alkoxylated with alkylene oxides, preferably ethylene oxide.

C) Amine Synthesis

According to a further suitable embodiment, the hydroformylated polyisobutenes obtained in step iv) are subjected, for the further functionalization, to a reaction of hydrogen and ammonia or a primary or secondary amine in the presence of an amination catalyst to give a polyisobutene which is at least partly functionalized with amino groups.

Suitable amination catalysts are the hydrogenation catalysts described above in stage B), preferably copper, cobalt or nickel, which can be used in the form of the Raney metals or on a support. Platinum catalysts are also suitable.

In the amination of ammonia, aminated polyisobutenes having primary amino functions are obtained. Primary and secondary amines suitable for the amination are compounds of the general formulae R—$NH_2$ and RR'NH, where R and R', independently of one another, are, for example, $C_1$-$C_{10}$-alkyl, $C_6$-$C_{20}$-aryl, $C_7$-$C_{20}$-arylalkyl, $C_7$-$C_{20}$-alkylaryl or cycloalkyl.

The amine number of the polyisobutenes having an amino function which are obtained depends on the number average molecular weight $M_n$. Products having a number average molecular weight $M_n$ of 10 000 Dalton preferably have amine numbers of from 2 to 5.6 mg KOH/g, in particular from 3.6 to 5.6 mg KOH/g. Products having a number average molecular weight $M_n$ of 40 000 Dalton have amine numbers of from 0.5 to 1.4 mg KOH/g, in particular from 0.9 to 1.4 mg KOH/g. The amine numbers of products having other molecular weights can be determined by interpolation or extrapolation.

The polyisobutenes functionalized with amino groups can additionally be alkoxylated with alkylene oxides, preferably ethylene oxide.

v) Preparation of Phosphonic Acid Derivatives

For the functionalization, the reactive polyisobutene can be subjected to a reaction with $PX_5$ (X=Cl, Br, I) to give a polyisobutene functionalized with a phosphonyl halide group. For the further functionalization and hence for permitting grafting, the derivatized polyisobutene is subjected to a subsequent reaction which is selected from:

a) reaction with at least one amine or polyethylenimine to give a polyisobutene which is at least partly functionalized with phosphonamide groups,
b) reaction with at least one alcohol or polyalkylene oxide to give a polyisobutene functionalized with phosphonic ester groups,
c) reaction with at least one alkylene oxide to give a polyisobutene functionalized with phosphonic ester groups,
d) hydrolysis to give a polyisobutene functionalized with phosphonic acid groups, the phosphonic acid groups being reacted with alkylene oxides as under c),
e) if, after the reaction of the phosphonyl halide group, free acid groups are still present they can also be converted into salts. Suitable cations in salts are especially alkali metal cations, ammonium ions and alkylammonium ions.

vi) Hydroboration

For the functionalization, the reactive polyisobutene can be subjected to a reaction with a borane (if appropriate, produced in situ), a hydroxylated polyisobutene being obtained.

Suitable hydroboration processes are described in J. March, Advanced Organic Chemistry, 4th Edition, Verlag John Wiley & Sons, pages 783-789, which is hereby incorporated by reference. Suitable hydroboration reagents are, for example, diborane, which as a rule is produced in situ by reacting sodium borohydride with $BF_3$ etherate, diisoamylborane (bis[3-methylbut-2-yl]borane), 1,1,2-trimethylpropylborane, 9-borobicyclo[3.3.1]nonane, diisocamphenylborane, which are obtainable by hydroboration of the corresponding alkenes with diborane, chloroboranedimethyl sulfide, alkyldichloroboranes or $H_3B$—$N(C_2H_5)_2$.

Usually, the hydroboration is carried out in a solvent. Suitable solvents for the hydroboration are, for example, acyclic ethers, such as diethyl ether, methyl tert-butyl ether, dimethoxyethane, diethylene glycol dimethyl ether, triethylene glycol dimethyl ether, cyclic ethers, such as tetrahydrofuran or dioxane, and hydrocarbons, such as hexane or toluene, or mixtures thereof. The reaction temperature is determined as a rule by the reactivity of the hydroboration agent and is usually from the melting point to the boiling point of the reaction mixture, preferably in the range from 0° C. to 60° C.

Usually, the hydroboration agent is used in excess, based on the alkene. The boron atom preferably undergoes addition at the less substituted and hence sterically less hindered carbon atom.

Usually, the alkylboranes formed are not isolated but are converted directly into the desired products by subsequent reaction. A very significant reaction of the alkylboranes is the reaction with alkaline hydrogen peroxide to give an alcohol, which preferably formally corresponds to the anti-Markovnikov hydroxylation of the alkene.

The polyisobutenes functionalized with alcohol groups can additionally be alkoxylated with alkylene oxides, preferably ethylene oxide.

vii) Reaction with an SO₃ Source

For the functionalization, the reactive polyisobutene can furthermore be reacted with an SO₃ source, a polyisobutene having terminal sulfo groups being formed.

The polyisobutenes functionalized with sulfo groups can be prepared by reacting the reactive polyisobutenes with an SO₃ source. Suitable SO₃ sources are a mixture of sulfur trioxide and air, sulfur trioxide hydrates, sulfur trioxide-amine complexes, sulfur trioxide-ether complexes, sulfur trioxide-phosphate complexes, oleum, acetyl sulfate, a mixture of sulfur trioxide and acetic anhydride, sulfamic acid, alkyl sulfates or chlorosulfonic acids. The reaction can be effected either in the absence of a solvent or in any desired inert anhydrous solvent. Suitable reaction temperatures are in the range from −30° C. to +200° C. and are dependent on the sulfonation reagent used. For example, a sulfonation with acetyl sulfate is effected at low temperatures, and elevated temperatures should be avoided, since otherwise decomposition of the product can occur. The sulfonation reagent is generally used in a molar ratio to polyisobutene of from 1:1 to 2:1. Acetyl sulfate or a mixture of sulfuric acid and acetic anhydride, acetyl sulfate being formed in situ, is preferably used, the polyisobutene functionalized with sulfo groups being formed directly. Others of said sulfonation reagents, for example the mixture of sulfur trioxide and oxygen, can initially form an intermediate sultone, which has to be hydrolyzed to the desired sulfonic acid. A process for the preparation of polyisobutenes functionalized with sulfo groups is disclosed, for example, in WO 01/70830.

The polyisobutenes functionalized with sulfo groups are reacted with alkylene oxides, polyalkylene oxides or polyethylenimines.

If free acid groups are still present after the functionalization, they can also be converted into the salt form. Suitable cations in salts are especially alkali metal cations, ammonium ions and alkylammonium ions.

viii) Functionalization with Amino Groups

For the functionalization, the reactive polyisobutene can be reacted with oxides of nitrogen, polyisobutenes having terminal amino groups being obtained after subsequent hydrogenation.

Suitable oxides of nitrogen are, for example, NO, NO₂, N₂O₃, N₂O₄, mixtures of these oxides of nitrogen with one another and mixtures of these oxides of nitrogen with oxygen. Mixtures of NO and NO₂ with oxygen are particularly preferred. Furthermore, the oxides of nitrogen can additionally comprise inert gases, e.g. nitrogen. The reaction of the polyisobutenes with the oxides of nitrogen is effected in general at a temperature of from −30 to +150° C. in an inert organic solvent. The products obtained are then hydrogenated, preferably by catalytic hydrogenation with hydrogen in the presence of hydrogenation catalysts. The hydrogenation is generally carried out in a temperature range from 20 to 250° C., depending on the reduction system used. The hydrogenation pressure in the catalytic hydrogenation is in general from 1 bar to 300 bar. A process for the preparation of polymers terminated with amino groups is disclosed, for example, in WO 97/03946.

The polyisobutenes functionalized with amino groups can additionally be alkoxylated with alkylene oxides, preferably ethylene oxide.

If acid groups (carboxyl, phosphonic acid, phosphoric acid or sulfuric acid groups) are reacted with polyalkylene oxides, it is possible to use polyalkylene oxides such as, for example, polyethylene oxide, polypropylene oxide, mixed copolymers of EO and PO, monoalkylpolyethylene oxide (alkyl=methyl-, ethyl-, $C_{12}$—, $C_{18}$—, etc.), monoaminoethylene oxide, etc. The reactions of the acid groups with these alkylene oxides are so-called polymer-analogous reactions (esterifications). The length of the alkylene oxide chain can be from 3 to 400 units.

The cosurfactants to be used in the mixtures according to the invention preferably have an AB structure.

Further preferred structures of the cosurfactant are $A_p B_q$, where p and q, independently of one another, are from 1 to 8, or comb structures comprising $A_2$ and $B_2$.

A cosurfactant which is an amphiphilic polymer having the general structural formula

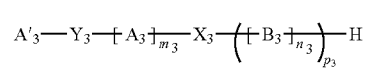

(I)

where
$A'_3$ is a straight-chain or branched alkyl, cycloalkyl, aryl or aralkyl radical having 1 to 60 carbon atoms,
$Y_3$ is O or S,
$A_3$ is a structural unit having the formula

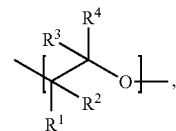

where
$R^1$, $R^2$, $R^3$ and $R^4$ independently of one another, are the substituents hydrogen, methyl, ethyl, n-propyl, isopropyl, octyl or phenyl, with the restriction that not more than three of the substituents $R^1$, $R^2$, $R^3$ and $R^4$ are hydrogen,
$m_3$ is a consecutive number in the range from 10 to 300,
$X_3$ is a structural unit having the formula

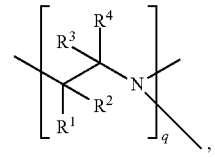

where the substituents
$R^1$, $R^2$, $R^3$ and $R^4$ independently of one another, are each hydrogen, methyl, ethyl, n-propyl, isopropyl, octyl or phenyl,
q=0 or q=1,
$B_3$ is a monomeric subunit based on ethylene oxide or of a mixture of ethylene oxide and propylene oxide,
$n_3$ is a consecutive number in the range from 20 to 500 and p=q+1,
can also advantageously be employed for the use according to the invention.

The general structural formula thus comprises both linear structures, if q=0, and structures branched in the y form, if q=1.

The structural unit $A'_3$—$Y_3$ is a hydrophobic component of the cosurfactant, and in particular a monofunctional straight-chain or branched alcohol or thiol radical, derived from the group consisting of the $C_1$- to $C_{60}$-alkyl, cycloalkyl, aryl or aralkyl alcohols or thiols Branched or straight-chain alcohols or thiols having 8 to 30 carbon atoms per alcohol or thiol radical are preferred.

Although all relatively short-chain aliphatic monohydroxyalcohols having 1 to 5 carbon atoms per molecule can in principle also be used as initiator alcohols A'—OH, monofunctional aliphatic alcohols having 6 to 18 carbon atoms per molecule are preferred, particularly preferably monofunctional aliphatic alcohols having 8 to 15 carbon atoms per molecule.

Suitable alcohols are in particular octanol, 2-ethylhexanol, nonanol, decanol, undecanol, dodecanol, 2-butyloctanol, tridecanol, tetradecanol, pentadecanol, isooctanol, isononanol, isodecanol, isoundecanol, isododecanol, isotridecanol, isotetradecanol and isopentadecanol, preferably isodecanol, 2-propylheptanol, tridecanol, isotridecanol or mixtures of $C_{13}$- to $C_{15}$-alcohols or mixtures of 2-propylheptanol with structurally isomeric $C_{10}$-alcohols. Oxo alcohols, as are usually obtained by hydroformylation of linear or branched olefins having 4 to 29 carbon atoms, which can be prepared, for example, by oligomerization of ethene, propene, 1-butene or isomeric butene mixtures or from mixtures of the abovementioned alkenes, or are derived from alcohols as are obtained starting from olefins having 5 to 30 carbon atoms, either by ozonolysis and subsequent reduction or by epoxidation and subsequent hydrolysis or by halogenation of chlorine or bromine and subsequent alkaline hydrolysis.

For example, the alcohols used according to the invention as an initiator compound may be Guerbet alcohols, in particular ethylhexanol, propylheptanol or butyloctanol. In a particularly preferred embodiment, the present invention therefore also relates to a process, the initiator compound being a Guerbet alcohol.

The alcohols used as the initiator compound may also be mixtures of different isomers.

These mixtures may be derived from the abovementioned alcohols or are obtained in the preparation thereof, for example crude products and individual fractions as are obtained in the distillative working-up of the crude products. Examples of suitable mixtures are so-called oxo oils or oxo oil fractions, as are usually obtained in the preparation of oxo alcohols.

Advantageously, an alcohol mixture which is obtained by trimerization of butene and subsequent hydroformylation and hydrogenation and is referred to as tridecanol N can be used as initiator alcohol A'-OH.

Propylheptanol, for example, can be obtained starting from valeraldehyde by aldol condensation and subsequent hydrogenation. The preparation of valeraldehyde and the corresponding isomers is effected by hydroformylation of butene, as described, for example, in U.S. Pat. No. 4,287,370; Beilstein E IV 1, 32 68, Ullmanns Encyclopedia of Industrial Chemistry, 5th Edition, Volume A1, pages 323 and 328 et seq. The following aldol condensation is described, for example, in U.S. Pat. No. 5,434,313, in Römpp, Chemie Lexikon, 9th Edition, key word "aldol addition", page 91. The hydrogenation of the aldol condensate follows general hydrogenation conditions.

Furthermore, 2-propylheptanol can be prepared by condensation of 1-pentanol (as a mixture of the corresponding methylbutan-1-ols) in the presence of KOH at elevated temperatures, cf. for example Marcel Guerbet, C. R. Acad Sci Paris 128, 511, 1002 (1899). Furthermore, reference may be made to Römpp, Chemie Lexikon, 9th Edition, Georg Thieme Verlag Stuttgart, and the citations mentioned there, and Tetrahedron, Vol. 23, pages 1723 to 1733.

Furthermore, alcohols which form from an addition reaction of acetone with aldehydes with subsequent hydrogenation are also suitable, as described in DE-A 100 35 617. Paraffin oxidation products which are substantially secondary alcohols (for example of C12/14-paraffin mixtures or $C_{10}$- to $C_{16}$-paraffin mixtures) are also suitable. Other suitable alcohols are, for example, secondary alcohols which are obtained by an addition reaction of water with olefins under acidic conditions or by free radical or other oxidation of olefins.

A large number of commercial products which are frequently present as isomer mixtures and are economically available are also obtainable by the processes described above. The product of the reaction of 2-ethylhexanal with acetone or methyl ethyl ketone and finally hydrogenation, the product of the reaction of $C_{13/15}$-aldehyde with acetone or methyl ethyl ketone, the product of the reaction of an isomer mixture of different $C_{13}$-aldehydes, of so-called isotridecanal, with acetone or methyl ethyl ketone may be mentioned by way of example. Examples of initiator alcohols which are obtainable by addition reaction of water with α-olefins are 2-decanol, 2-dodecanol, 2-tetradecanol or 2-hexadecanol.

Other suitable initiator alcohols A'-OH are alicyclic and aromatic hydroxy compounds, preferably compounds of the formulae

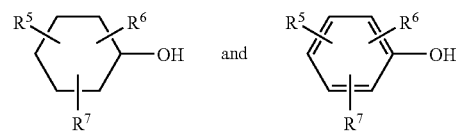

where
$R^5$, $R^6$ and $R^7$, independently of one another, are hydrogen or $C_1$-$C_{30}$-alkyl.

Preferred alicyclic and aromatic hydroxy compounds are cyclohexanol, phenol, the cresol isomers, isobutylphenol, isobutylcresol, diisobutylphenol, diisobutylcresol, tert-butylphenol, tert-butylcresol, di-tert-butylphenol, di-tert-butylcresol, isooctylphenol, diisooctylphenol, isononylphenolt diisononylphenol, isododecylphenol, diisododecylphenol and mixtures thereof.

The hydrophobic structural unit A is preferably formed from one or more of the following monomers: propene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 2,3-hexene oxide, 3,4-hexene oxide, 2-methyl-1,2-pentene oxide, 2-ethyl-1,2-butene oxide, 3-methyl-1,2-pentene oxide, 4-methyl-1,2-pentene oxide, decene oxide, 4-methyl-1,2-pentene oxide or styrene oxide or from mixtures thereof. These preferably also include mixtures which are obtainable by oxidation of industrially available olefin streams and which may comprise further alkylene oxides differing from the abovementioned ones and/or olefins not included in the oxidation and/or inert substances (alkanes).

The consecutive number $m_3$ which designates the number of repeating structural units $A_3$ preferably assumes a value in the range from 50 to 250, in particular from 60 to 160.

The structural unit $X_3$, comprising an amino group, can be incorporated as a branching point into the amphiphilic polymer.

The structural unit [B]n is a hydrophilic component of the cosurfactant, formed from repeating ethylene oxide or ethylene oxide/propylene oxide units. $B_3$ is a monomeric subunit based on ethylene oxide or on a mixture of ethylene oxide (EO) and propylene oxide (PO). The structural unit $[B_3]n_3$ may be a random copolymer, a gradient copolymer or an alternating or a block copolymer of EO and PO.

The polymer structure may comprise a single hydrophilic component $[B]n_3$ or, via the branching point on the nitrogen atom, two hydrophilic components $[B_3]n_3$.

The consecutive number $n_3$ which designates the number of repeating structural units $B_3$ preferably assumes a value in the range from 50 to 300.

$B_3$ can advantageously be an ethylene oxide/propylene oxide mixture having from 0 to 50% of propylene oxide, preferably from 5 to 20% of propylene oxide.

The mixture which can be employed for the use according to the invention comprises a surfactant in addition to the cosurfactants described above. Said surfactant may also be a mixture of surfactants. In principle, it is possible to use any surfactant from each of the known surfactant groups, in particular ionic or nonionic surfactants, or mixtures of ionic or nonionic surfactants.

In terms of the surfactant classes, nonionic, anionic, cationic and amphoteric surfactants are suitable; in particular also polymer surfactants, peptide surfactants, silicone surfactants, amino acid-based surfactants, sugar surfactants, fat-based surfactants, Gemini surfactants, amine oxides, amidoamine oxides, alkylbetaines, ether carboxylates, amphoacetates, alkyl sulfates or sulfosuccinates.

The proportion of the cosurfactant, based on the surfactant, is preferably in the range from 0.01 to 99.99%, in particular from 1 to 50%, particularly preferably from 5 to 25%.

Suitable anionic surfactants are, for example, fatty alcohol sulfates of fatty alcohols having 8 to 22, preferably 10 to 18, carbon atoms, for example C9- to C11-alcohol sulfates, $C_{12}$- to $C_{1-3}$-alcohol sulfates, cetyl sulfate, myristyl sulfate, palmityl sulfate, stearyl sulfate and tallow fatty alcohol sulfate.

Further suitable anionic surfactants are sulfated ethoxylated $C_8$- to $C_{22}$-alcohols (alkyl ether sulfates) or the soluble salts thereof. Compounds of this type are prepared, for example, by first alkoxylating a $C_8$- to $C_{22}$-alcohol, preferably a $C_{10}$- to $C_{18}$-alcohol, for example a fatty alcohol, and then sulfating the alkoxylation product. Ethylene oxide is preferably used for the alkoxylation, from 2 to 50, preferably from 3 to 20, mol of ethylene oxide being used per mole of fatty alcohol. The alkoxylation of the alcohols can, however, also be carried out with propylene oxide alone and, if appropriate, butylene oxide. Those alkoxylated $C_8$- to $C_{22}$-alcohols which comprise ethylene oxide and propylene oxide or ethylene oxide and butylene oxide are also suitable. The alkoxylated $C_8$- to $C_{22}$-alcohols may comprise the ethylene oxide, propylene oxide and butylene oxide units in the form of blocks or in random distribution.

Alkanesulfonates, such as $C_8$- to $C_{24}$-alkanesulfonates, preferably $C_{10}$- to $C_{18}$-alkanesulfonates, and soaps, such as Na or K salts of $C_8$- to $C_{24}$-carboxylic acids, are also suitable.

Further suitable anionic surfactants are N-acylsarcosinates having aliphatic saturated or unsaturated $C_8$- to $C_{25}$-acyl radicals, preferably $C_{10}$- to $C_{20}$-acyl radicals, for example N-oleoylsarcosinate.

Furthermore, the mixtures according to the invention may comprise linear and/or slightly branched $C_{10}$- to $C_{1-3}$-alkylbenzenesulfonates (LAS).

The anionic surfactants are added to the mixture, preferably in the form of salts. Suitable cations in these salts are alkali metal salts, such as sodium, potassium and lithium, and ammonium salts, such as, for example, hydroxyethylammonium, di(hydroxyethyl)ammonium and tri(hydroxyethyl)ammonium salts.

Particularly suitable nonionic surfactants are:

alkoxylated $C_8$- to $C_{22}$-alcohols, such as fatty alcohol alkoxylates or oxo alcohol alkoxylates. These can be alkoxylated with ethylene oxide, propylene oxide and/or butylene oxide. Surfactants which may be used here are all alkoxylated alcohols which comprise at least two molecules of one of the above-mentioned alkylene oxides incorporated by an addition reaction. Block polymers of ethylene oxide, propylene oxide and/or butylene oxide or adducts which comprise said alkylene oxides in random distribution are suitable here. The nonionic surfactants comprise in general from 2 to 50, preferably from 3 to 20, mol of at least one alkylene oxide per mole of alcohol. These preferably comprise ethylene oxide as the alkylene oxide. The alcohols preferably have 10 to 18 carbon atoms. Depending on the type of alkoxylation catalyst used in the preparation, the alkoxylates have a broad or narrow alkylene oxide homolog distribution;

alkylphenol alkoxylates, such as alkylphenol ethoxylates having $C_6$- to $C_{14}$-alkyl chains and from 5 to 30 alkylene oxide units;

polyalkyl glucosides having 8 to 22, preferably 10 to 18, carbon atoms in the alkyl chain and in general from 1 to 20, preferably from 1.1 to 5, glucoside units, sorbitan alkanoates, also alkoxylated;

N-alkylglucamides, fatty acid alkoxylates, fatty acid amine alkoxylates, fatty acid amide alkoxylates, fatty acid alkanolamide alkoxylates, block copolymers of ethylene oxide, propylene oxide and/or butylene oxide, polyisobutene ethoxylates, polyisobutene/maleic anhydride derivatives, monoglycerides, also alkoxylated, and bisglycerides.

Particularly suitable nonionic surfactants are alkyl alkoxylates or mixtures of alkyl alkoxylates, as described, for example, in DE-A 102 43 363, DE-A 102 43 361, DE-A 102 43 360, DE-A 102 43 365, DE-A 102 43 366, DE-A 102 43 362 or in DE-A 43 25 237. These are alkoxylation products which were obtained by reacting alkanols with alkylene oxides in the presence of alkoxylation catalysts or are mixtures of alkoxylation products. Particularly suitable initiator alcohols are the so-called Guerbet alcohols, in particular ethylhexanol, propylheptanol and butyloctanol. Propylheptanol is particularly preferred. Preferred alkylene oxides are propylene oxide and ethylene oxide, alkyl alkoxylates having a direct link of a preferably short polypropylene oxide block to the initiator alcohol, as described, for example, in DE-A 102 43 365, being preferred in particular because of their low residual alcohol content and their good biodegradability.

Bases, for example alkali metal hydroxides or alkali metal alcoholates, but also Lewis acids, for example $BF_3$, $SbCl_5$, $SnCl_4.2H_2O$, $BF_3.H_3BO_4$ or $BF_3$-etherate, may be used as alkoxylation catalysts. Particularly suitable alkoxylation catalysts are double hydroxide clays, such as hydrotalcite, which in particular can be modified with additives, as described in DE-A 43 25 237.

Depending on the choice of the alkoxylation catalyst, specific properties of the alkoxylates, in particular with regard to the distribution of the degree of alkoxylation, result in each case. Thus, with the use of the last-mentioned double hydroxide clays, alkoxylation products having a narrow molecular weight distribution or homolog distribution are obtained, which alkoxylation products are particularly suitable for use in the mixtures with cosurfactants.

The advantageous properties described above, in particular with regard to the degree of alkoxylation, are also obtained by using double metal cyanide (DMC) compounds, as described as alkoxylation catalysts, for example in DE-A 102 43 361.

The invention also relates to a process for flooding underground deposits of hydrocarbons for mobilizing and recovering the hydrocarbons from the underground deposits using a liquid mixture comprising a surfactant and a cosurfactant, the cosurfactant corresponding to the definition in any of claims 1 to 29, wherein the liquid mixture comprising a surfactant and a cosurfactant is forced through at least one well into an underground deposit of hydrocarbons and hydrocarbons are withdrawn from the deposit through at least one well differing therefrom, and wherein water is forced into the well in a further process stage.

It is thus possible to use the mixture comprising a surfactant and a cosurfactant in undiluted form provided that said mixture is liquid under application conditions.

However, it is also possible to use the liquid mixture comprising a surfactant and a cosurfactant as an aqueous solution having a concentration of from 20 to 95% by weight of the sum of surfactant and cosurfactant, preferably from 30 to 60% by weight of the sum of surfactant and cosurfactant, and a surfactant/cosurfactant ratio of from 2:1 to 50:1, in particular from 5:1 to 20:1.

It is also possible for the liquid mixture comprising a surfactant and a cosurfactant to be diluted with water, before being forced into the well, to 0.01 to 10% by weight of the sum of surfactant and cosurfactant, in particular 0.05 to 7% by weight, preferably 0.05 to 5% by weight, or for the dilution of the liquid mixture comprising a surfactant and a cosurfactant to be effected with water which is already present in the deposit.

Furthermore, the surfactant and the cosurfactant can each be added separately to an aqueous solution which is forced through at least one well into an underground deposit of hydrocarbons.

Advantageously, a sacrificial agent can be introduced into the underground deposit before forcing in an aqueous solution comprising a surfactant and a cosurfactant, and/or a polymer flood can be introduced into the underground deposit after forcing in the aqueous solution comprising a surfactant and a cosurfactant.

The invention is explained in more detail below with reference to an embodiment and a drawing.

Sections of the phase diagrams water:n-decane (1:1) and the surfactant Lutensol® ON 50, i.e. a $C_{10}$-alcohol reacted with 5 mol of ethylene oxide, were determined as a function of the temperature, a cosurfactant formed from a $C_{13}$-alcohol reacted with 22 mol of butylene oxide and 82 mol of ethylene oxide per mole of $C_{1\text{-}3}$-alcohol additionally being used in a concentration of 10% by weight, based on the surfactant Lutensol® ON 50, in the example according to the invention, and, for comparison, the corresponding phase diagram without addition of said cosurfactant being recorded.

The minimum concentration of surface-active substance which is required to form a one-phase microemulsion of water and the hydrocarbon n-decane is defined as the X-point in the phase diagram in a known manner.

It was found that the X-point in the example according to the invention, i.e. as a result of the addition of the abovementioned cosurfactant, shifts from 22.5% by weight of Lutensol at 45° C. to 15% by weight of Lutensol at 49° C.

The embodiment thus shows that the X-point in the phase diagram water:n-decane (1:1)/Lutensol® ON 50 shifts to a surfactant concentration which is 7.5% lower as a result of adding a cosurfactant corresponding to the definition in the present patent application.

By the use, according to the invention, of a mixture comprising a surfactant and a cosurfactant, the same efficiency is therefore achieved with a lower concentration of surfactant compared with the use of a mixture without addition of cosurfactant, corresponding to known surfactant flooding, i.e. the process is substantially more economical due to the saving of surfactant.

Figure 2:
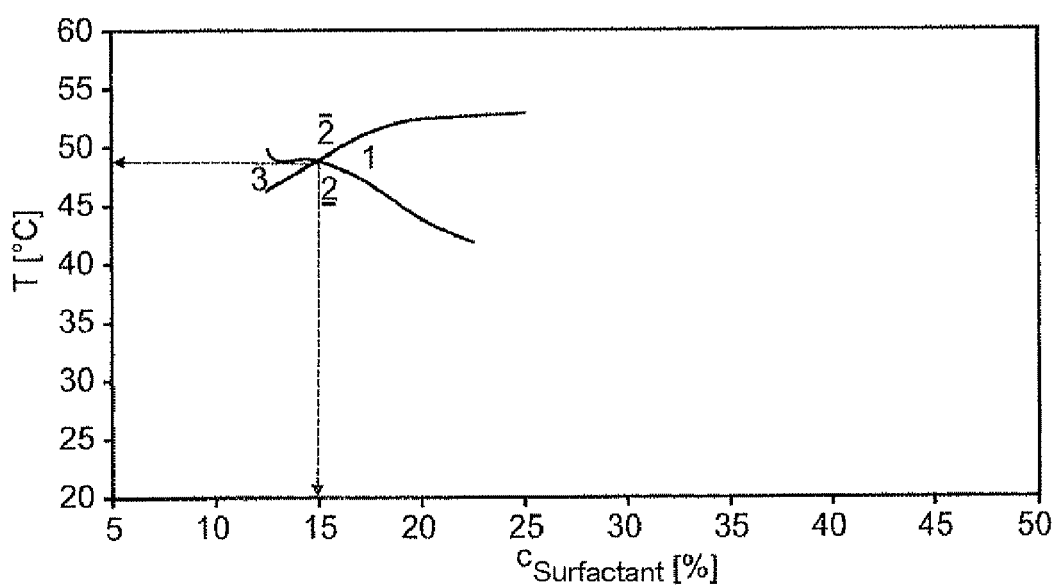

In the drawing,

FIG. 1 shows a section of the phase diagram water:n-decane (1:1) and Lutensol® ON 50 without addition of a cosurfactant, for comparison, and FIG. 2 shows a section of the phase diagram water:n-decane (1:1) and Lutensol® ON 50 with addition of 10% by weight of the cosurfactant Kerocom® ES3364+90EO, i.e. a cosurfactant formed from a $C_{13}$-alcohol reacted with 22 mol of butylene oxide and 90 mol of ethylene oxide per mole of $C_{13}$-alcohol.

The X-point, i.e. the minimum concentration of surfactant at which a one-phase microemulsion forms, is 22.5% by weight of Lutensol® at 45° C. for the mixture according to the comparison (FIG. 1) or 15% by weight of Lutensol® at 49° C. for the example according to the invention (FIG. 2). That region to the right of the X-point which is designated by 1 is the one-phase region of a microemulsion, the region designated by $\overline{2}$ is a two-phase region comprising a water-in-oil microemulsion in equilibrium with oil, $\underline{2}$ is a two-phase region comprising oil-in-water microemulsions which are in equilibrium with excess water, and 3 is a three-phase region consisting of a microemulsion in equilibrium with excess water and excess oil. In addition, it is evident from FIGS. 1 and 2 that, as a result of the use according to the invention of a cosurfactant, the application-relevant three-phase region 3 also to lower surfactant concentrations simultaneously with the one-phase region 1.

We claim:

1. A method for mobilizing and recovering the hydrocarbons from underground deposits comprising flooding said underground deposits of hydrocarbons with a liquid mixture comprising a surfactant and a cosurfactant, wherein the proportion of the cosurfactant, based on the surfactant, is in the range of from 0.01 to 99.99%, and wherein the cosurfactant is one or more amphiphilic polymers having the general structural formula

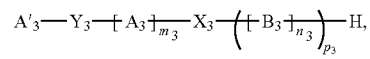

wherein $A'_3$-$Y_3$ is a monofunctional straight-chain or branched alcohol or thiol radical having 8 to 30 carbon atoms per molecule, $A_3$ is a structural unit having the formula

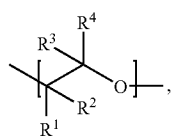

wherein
R$^1$, R$^2$, R$^3$, and R$^4$ are, independently of one another, hydrogen, methyl, ethyl, n-propyl, isopropyl, octyl, or phenyl, with the proviso that not more than three of R$^1$, R$^2$, R$^3$ and R$^4$ are hydrogen,
m$_3$ is an integer from 10 to 300,
X$_3$ is a structural unit having the formula

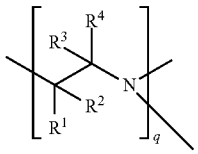

wherein
R$^{1, R2}$, R$^3$, and R$^4$ are, independently of one another, hydrogen, methyl, ethyl, n-propyl, isopropyl, octyl, or phenyl,
q is 1,
B$_3$ is a monomeric subunit based on ethylene oxide or a mixture of ethylene oxide and propylene oxide,
n$_3$ is an integer from 20 to 500, and
p$_3$ is q+1.

2. The method of claim 1, wherein the mixture is used in the form of an aqueous solution.

3. The method of claim 1, wherein the structural unit A$_3$ is formed from one or more of the following monomers: propene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 2,3-hexene oxide, 3,4-hexene oxide, 2-methyl-1,2-pentene oxide, 2-ethyl-1,2-butene oxide, 3-methyl-1,2-pentene oxide, decene oxide, 4-methyl-1,2-pentene oxide, styrene oxide.

4. The method of claim 1, wherein m$_3$ is an integer from 50 to 250.

5. The method of claim 1, wherein n$_3$ is an integer from 50 to 300.

6. The method of claim 1, wherein B$_3$ is an ethylene oxide/propylene oxide mixture having from 0 to 50% of propylene oxide.

7. The method of claim 1, wherein the mobilizing and recovering of said hydrocarbons from underground deposits comprises flooding said underground deposits of hydrocarbons by forcing said liquid mixture through at least one well into an underground deposit of hydrocarbons and withdrawing said hydrocarbons from said deposit through at least one well differing therefrom, wherein water is subsequently forced into the well.

8. The method of claim 7, wherein the liquid mixture comprising a surfactant and a cosurfactant is an aqueous solution having a concentration of from 20 to 95% by weight of the sum of surfactant and cosurfactant.

* * * * *